June 27, 1967           W. M. FORD           3,327,719
DENTAL FLOSS HOLDER WITH ROTARY FLOSS TENSIONING MEANS
Filed Dec. 17, 1964
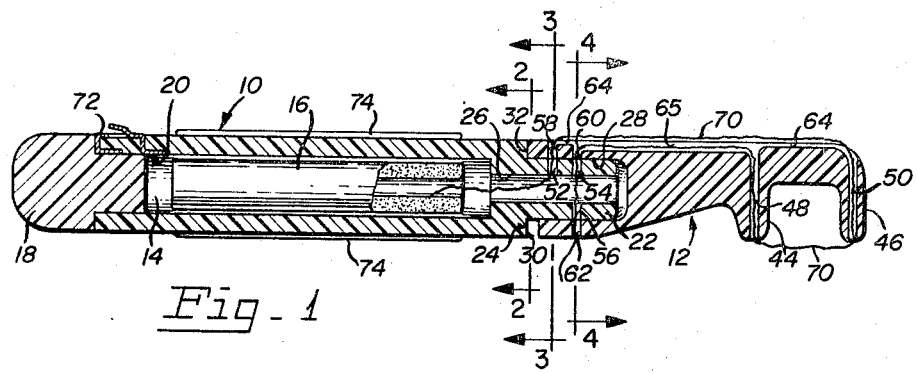
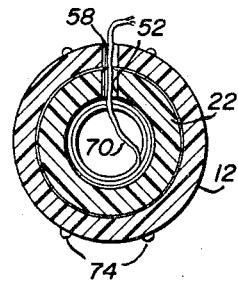
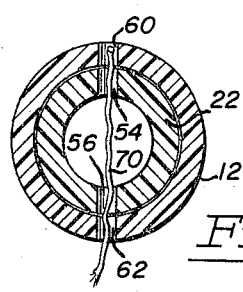
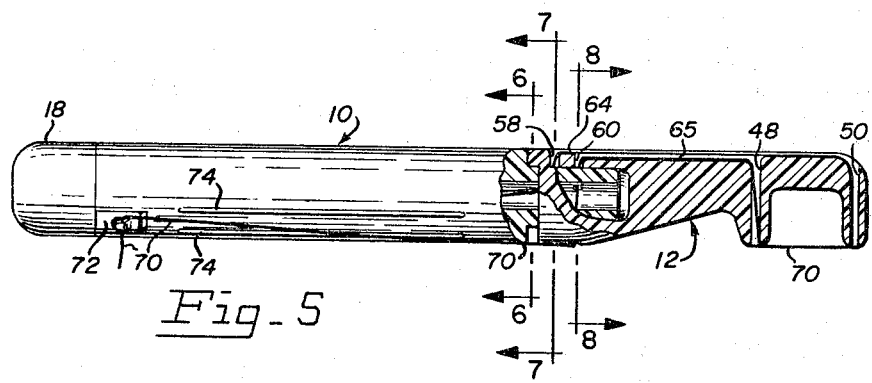
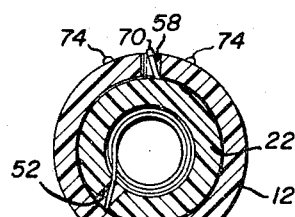
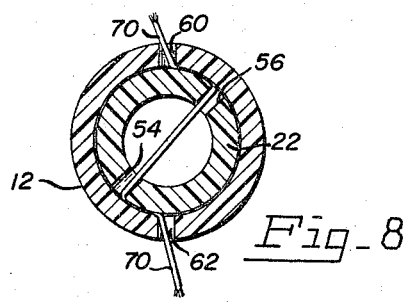
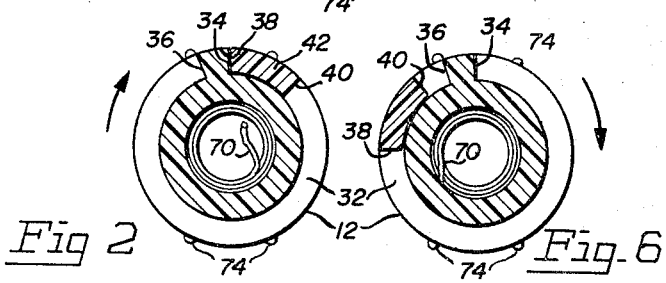
INVENTOR
WILLIAM M. FORD
BY
*Harvey S. Lawhurst*
ATTORNEY United States Patent Office 3,327,719
Patented June 27, 1967

3,327,719
DENTAL FLOSS HOLDER WITH ROTARY FLOSS
TENSIONING MEANS
William M. Ford, Palo Alto, Calif., assignor to The
Boeing Company, Seattle, Wash., a corporation of
Delaware
Filed Dec. 17, 1964, Ser. No. 419,137
13 Claims. (Cl. 132—92)

This invention relates to a tooth cleaning device, and more particularly to a dental floss holder so constructed and arranged that its supply of dental floss, located within the handle portion, dispenses a strand of dental floss which is held taut across a pair of spaced arms for insertion into the spaces between the teeth.

Dental floss has found wide application in the cleaning of spaces between teeth and in the massaging of the gum portions between the teeth. In most instances of use the floss is tensioned by holding it between the hands of the user requiring him to open his mouth very wide. There are presently available a number of holders which tension the dental floss across a pair of spaced members for more convenient use. However, none of the prior art holders is simple in construction and made of two parts and which allows tensioning and feeding of the floss by simply rotating one part of the holder with respect to the other.

It is another object of this invention to provide a dental floss holder which will hold opposite ends of a portion of the strand of dental floss and which has associated therewith a mechanism whereby the portion held between the spaced arms may be drawn to a taut condition and retained in the condition, while at the same time the mechanism may be easily and quickly moved for feeding an additional quantity of dental floss into the position between the spaced arms.

It is another object of this invention to provide a dental floss holder having a handle portion containing a supply of dental floss and a head portion having a pair of spaced arms across which the dental floss is tensioned and in which relative rotation between the head and the handle portion in one direction tensions the floss across the arms and in the other direction allows feeding of additional dental floss.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawing in which:

FIG. 1 is a side view and cross section of the dental floss holder showing the dental floss threaded through the holder and the holder in the feeding position;

FIGS. 2, 3 and 4 are respectively enlarged cross sectional views taken along lines 2—2, 3—3 and 4—4 of FIG. 1;

FIG. 5 is a side elevational view, partly in cross section, of the dental floss holder in the tensioning position; and FIGS. 6, 7 and 8 are respectively enlarged cross sectional views taken along lines 6—6, 7—7 and 8—8 of FIG. 5.

Referring now to the drawing, in which like reference characters indicate like parts, there is shown the dental floss holder of this invention which comprises a handle portion 10 and a head portion 12 slidingly and rotatably received by handle portion 10. Handle portion 10 may be of generally cylindrical configuration having an internal bore 20 which defines an inner space 14 dimensioned for accommodating a roll or spool of dental floss 16. Handle portion 10 also includes a plug or closure member 18 which closes one end of bore 20. For a refillable dental floss holder, plug 18 may be slidingly received in bore 20 or may be threaded together with bore 20 for ready removal to allow the insertion of a new spool when the one in space 14 is exhausted. In case the dental floss holder is constructed to be non-refillable, plug 18 may either be press fitted or cemented into bore 20.

Handle portion 10 is also provided with a reduced diameter cylindrical neck portion 22 which depends axially from a shoulder 24. Cylindrical neck portion 22 includes a bore 26 in communication with inner space 14.

Head portion 12 is provided with an internal bore 28 which is dimensioned to be slidingly received by neck portion 22 of handle portion 10. Annular end face 30 of head portion 12 engages shoulder 24 of handle portion 10 when head portion 12 fully engages neck portion 22. In this manner, head portion 12 is rotatable with respect to handle portion 10 and proper axial spacing is assured by keeping shoulder 24 and end face 30 in contact with one another.

To limit rotation between handle portion 10 and head portion 12 between a first and a second position shoulder 24 is provided with an undercut or keyway 32 as best seen in FIGS. 2 and 6 which extends between end faces 34 and 36. End faces 34 and 36 form a stop means, which cooperates with the end faces 38 and 40 of a boss or key 42, integral with and depending axially outwards from annular end face 30. In this manner relative rotation between handle portion 10 and head portion 12 is limited between the first position in which end face 38 abuts end face 34 and the second position in which end face 40 abuts end face 36. FIG. 2 shows head portion 12 in the first position and FIG. 6 shows head portion 12 in the second position. The angular displacement between the first and the second position may be selected to be anywhere from a few degrees up to 300 degrees and is equal to the arc length of keyway 32 minus the arc length of key 42. For best operation, the angular travel is made as large as possible for reasons which will become better understood hereinafter, and an angular displacement of 270 degrees has been found very satisfactory.

Head portion 12 is also provided with a pair of arms 44 and 46 at right angles to its longitudinal axis. Each arm includes an axial passage therethrough which is respectively designated by reference characters 48 and 50. Further, neck portion 22 is provided with three radial openings respectively shown at 52, 54 and 56 which are in axial alignment with three similar openings in head portion 12 indicated at 58, 60 and 62 and best seen in FIGS. 1, 3 and 4. When head portion 12 is moved to its second position, these radial openings become angularly separated as best seen in FIGS. 7 and 8.

There is also provided a deep groove 65 in head portion 12 which extends between axial passage 48 and radial opening 60 along the upper part of head portion 12 as best seen in FIG. 5. Groove 65 is sufficiently deep so that floss 70, upon being pulled through the dental floss holder, does not contact the section of floss 70 extending between radial opening 58 and axial passage 50. To accommodate the section of floss 70 from radial opening 58 to axial passage 50, a further and more shallow groove 64 may be provided in head portion 12 which commences at radial opening 58 and which terminates at axial passage 50.

As a practical matter, deep groove 65 is constructed as an undercut in the bottom of shallow groove 64, the depth of the undercut being about 0.005 to 0.010 inch.

Dental floss 70 from spool 16 is threaded into bore 26 and through aligned radial openings 52 and 58 out of the dental floss holder. From opening 58, floss 70 is laid along shallow groove 64 and threaded through axial passage 50 to the tip of arm 46 so that upon being tensioned it stretches across deep groove 65 without touching its bottom. From the tip of arm 46 it is passed to the tip of arm 44 to span the gap across the arms. Next, it is threaded through axial passage 48, laid along deep groove 65 and returned to the interior of the dental floss holder through aligned radial openings 60 and 54. In this manner, there is no contact between the floss in the shallow and the deep groove. Finally, the floss is threaded through aligned axial openings 56 and 62 out of the holder to a clamping and cutting means 72. Clamping and cutting means 72 may be located at any convenient point along handle portion 10 and serves the purpose of cutting off extra length of floss 70 and to clamp the uncut portion in place to prevent its dangling loosely out of opening 62.

There may also be provided a pair of ribs 74 along handle portion 10 as best seen in FIG. 5 to enable the user to orient the dental floss holder without looking at head portion 12 and thereby position it for operational use. Ribs 74, in addition to providing an orientation means, also assure a better grip on handle portion 10.

In the operation of the dental floss holder of this invention, dental floss 17 is threaded in the manner indicated above when handle portion 10 and head portion 12 are in the first position and the floss coming out of opening 62 is pulled so that there is no slack. Thereafter head portion 12 is turned towards the second position with respect to handle portion 10 which causes dental floss 70, threaded through the six radial openings, to be squeezed between the outer surface of neck portion 22 and the inner surface of bore 28. The motion from the first to the second position also tensions dental floss 70 across spaced arms 44 and 46 since its path length is substantially increased as the radial openings are misaligned as best seen in FIGS. 7 and 8. It may also be noted that by turning head portion 12 towards its second position the floss passing through passages 48 and 50 is tensioned from both sides simultaneously assuring a secured and tight floss across space arms 44 and 46.

To place a fresh section of floss across the spaced arms after use, the head portion is returned to its first position and the floss is advanced by pulling the strand which projects out of radial opening 62 until a fresh section of floss spans the spaced arms. It is to be noted that at no time is there physical contact between the spent section and the clean floss since the spent section is accommodated in deep groove 65 and therefore out of contact with the advancing floss in shallow groove 64. Of course, instead of utilizing a shallow groove with an undercut forming the deep groove, separate grooves may be substituted therefor.

While it is essential that radial openings 52, 58 and 54, 60 be located in the overlapping region, i.e. the region of neck portion 22, this is not true of openings 56, 62. The latter pair of openings may be replaced with a single opening either in handle portion 10 or head portion 12 since its primary function is to provide a means of threading the floss out of the dental floss holder for advancing the same. In other words, the holder of this invention will operate entirely satisfactory if the floss is not clamped and tensioned by openings through which the floss passes out of the holder.

While it is desirable to have openings 58 and 60 substantially parallel to passages 48 and 50 for best appearance and for permitting utilization of an accommodation groove with a stepwise changing depth, opening 62 may be placed anywhere since its sole function is to provide access to the floss end to permit pulling additional floss across spaced arms 44 and 46.

There has been described a dental floss holder which comprises a handle portion and a head portion slidably and rotatably jointed to one another for rotation between a first position in which dental floss may be pulled through the device for renewal and a second position in which the dental floss is tightly and securely stretched across the spaced arms for the cleaning of teeth and the massaging of gums. While the device shown is generally of cylindrical configuration, it is to be understood that it may be constructed of a curved handle portion or a curved head portion or a combination thereof to facilitate insertion into the mouth for more convenient cleaning of teeth and massaging of gums.

What is claimed is:

1. A dental floss holder comprising:

a handle portion including an inner space adapted for the reception of a roll of dental floss;

a head portion rotatably coupled to said handle portion and having an overlapping region therewith, said head portion including a pair of spaced arms having floss receiving means and means associated with said overlapping region to limit rotation between said handle portion and head portion;

at least first and second openings in said handle portion and in said head portion in said overlapping region and in axial alignment with one another when said handle portion and said head portion have a predetermined angular position with respect to one another, the floss from the roll being adapted to be threaded out of the inner space of said holder through said first openings, through the floss receiving means first in one and then the other arm to span the gap between said arms, and back into said holder through said second openings, whereby rotation of said head portion from its predetermined angular position misaligns said first and second openings in said handle portion with respect to the first and second openings in said head portion to tension and to securely lock the floss across said arms; and a third opening in said floss holder for communication with said inner space through which the floss from said second openings is adapted to be threaded out of the holder to allow advancing of the floss when said head portion and said handle portion are in said predetermined angular position.

2. A dental floss holder comprising:

a handle portion having an inner space adapted for reception of a roll of dental floss, a reduced diameter cylindrical neck portion at one end thereof, and a shoulder associated with said neck portion;

a head portion slidingly and rotatably engaging said neck portion and including a face for engaging said shoulder, said head portion further including a pair of spaced arms each having a floss receiving means;

means associated with said shoulder and said face to limit rotation between said handle portion and head portion between a first and a second position;

first and second radial openings in said neck portion and said head portion, said openings being positioned for axial alignment in pairs when said handle portion and head portion are in said first position, the dental floss from said roll being adapted to be threaded through said first pair of openings out of said holder, through said floss receiving means in said arms to span the gap between said arms, and into said holder through said second pair of openings, whereby rotation of said head portion with respect to said handle portion from said first position towards said second position causes a misalignment of said openings to tension and securely hold the floss across said arms; and a third opening in said holder through which the floss from said second openings is adapted to be threaded out of the holder.

3. A dental floss holder in accordance with claim 2 in which said second radial opening in said head portion is intermediate said first radial opening and said arms, and one of said arms is spaced closer to said second radial opening in said head than the other arm, a groove means in said head portion extending between the thread receiving means in the arm closest to said second radial opening and said second radial opening to accommodate the floss out of physical contact with the floss extending between said first radial opening and the arm furthest from said first radial opening.

4. A dental floss holder comprising:
   a handle portion including an outwardly facing shoulder at one end thereof, a reduced diameter cylindrical neck portion depending from said shoulder, and an inner space adapted for reception of a roll of dental floss;
   a head portion including an internal bore dimensioned for sliding engagement with said neck portion, an annular end face for slidingly engaging said shoulder, and a pair of spaced arms, substantially at right angles to said internal bore, each arm having an axial passage therethrough;
   limit means associated with said shoulder and said annular face to limit rotation between said slidingly engaged handle portion and head portion between a first and a second position;
   a first, second and third substantially radial opening in the wall of said neck portion and in the wall of said head portion, said openings being positioned for axial alignment in pairs when said handle portion and head portion are in said first position, the floss from said roll being adapted to be theaded from said inner space through said first pair of openings, into the axial passage in one arm, across the span between arms, into the axial passage in the other arm, through said second pair of openings into said neck portion, and through said third pair of openings out of said holder, in that order, whereby rotation of said head portion with respect to said handle portion towards said second position tensions said floss tightly and securely across said spaced arms 5. A dental floss holder in combination with a roll of dental floss comprising:
   a handle portion including a shoulder at one end thereof, a neck portion depending from said shoulder, and an inner space receiving said roll of dental floss;
   a head portion including an internal bore dimensioned for sliding engagement with said neck portion, an end face for engaging said shoulder, and a pair of spaced arms, each arm having an axial passage therethrough;
   means associated with said shoulder and said face to limit rotation between said slidingly engaged handle portion and head portion between a first and a second position; and
   a first, second and third substantially radial opening in the wall of said neck portion and in the wall of head portion, said openings being positioned for axial alignment in pairs when said handle portion and head portion are in said first position, the floss being threaded from said roll in said inner space out through said first pair of openings, into the axial passage in one arm, across the span between arms, into the axial passage in the other arm, through said second pair of openings into said neck portion, and through said third pair of openings out of said holder, in that order, whereby rotation of said head portion with respect to said handle portion towards said second position tensions said floss tightly and securely across said spaced arms.

6. A dental floss holder in combination with a roll of dental floss comprising:
   a handle portion including an annular shoulder at one end thereof, a reduced diameter cylindrical neck portion depending outwardly from said shoulder, and an inner space receiving said roll of dental floss;
   a head portion including an internal bore dimensioned for sliding reception of said neck portion, an annular end face for engaging said shoulder, and a pair of spaced arms extending outwardly at right angles to said head portion and lying in a plane containing the longitudinal axis of said head portion, each arm having an axial passage open at both ends;
   means associated with said shoulder and said face to limit rotation between said slidingly engaged handle portion and head portion between a first and a second position; and
   a first, second and third radial opening in the wall of said neck portion and in the wall of said head portion, said openings being positioned for axial alignment in pairs when said handle portion and head portion are in said first position, said head portion also having a groove extending along its surface from the axial passage in the arm most distant from said face to said first opening, said floss being threaded from said inner space out of said holder through said first pair of openings, along said groove and through the axial passage of the arm most distant to said face, across the outer tips of said arms, through the axial passage in the other arm, along said groove and through said second pair of openings into said holder, and through said third pair of openings out of said holder, in that order, whereby rotation of said head portion with respect to said handle portion towards said second position tensions said floss tightly and securely across said spaced arms.

7. A dental floss holder in accordance with claim 6 in which said first and second radial openings are parallel to said axial passages.

8. A dental floss holder in accordance with claim 6 in which said handle means includes a cutting and clamping means for cooperation with the floss from said third radial openings.

9. A dental floss holder in accordance with claim 6 in which said handle portion includes rib means located symmetrically with respect to a plane containing the longitudinal axis of said spaced arms.

10. A dental floss holder in combination with a roll of dental floss comprising:
    a handle portion including a shoulder at one end thereof, a neck portion depending from said shoulder, and an inner space receiving said roll of dental floss;
    a head portion including an internal bore dimensioned for sliding engagement with said neck portion, an end face for engaging said shoulder, and a pair of spaced arms, each arm having a threading passage therethrough;
    means associated with said shoulder and said face to limit rotation between said slidingly engaged handle portion and head portion between a first and a second position;
    a first and second substantially radial opening in the wall of said neck portion and in the wall of head portion, said openings being positioned for axial alignment in pairs when said handle portion and head portion are in said first position, the floss being threaded from said roll in said inner space out through said first pair of openings, into the threading passage in one arm, across the span between said arms, into the threading passage in the other arm, and into said second pair of openings into said neck portion, in that order;
    a further opening in combination with said inner space through which the floss is passed from said second radial opening out of said dental floss holder; and
    accommodation means in said head portion extending between said second radial opening and said other arm to accommodate the floss therebetween and to isolate this portion of the floss from the portion of the floss extending between said first radial opening and said one arm.

11. A dental floss holder in combination with a roll of dental floss comprising:

a handle portion including an annular shoulder at one end thereof, a reduced diameter cylindrical neck portion depending outwardly from said shoulder, and an inner space receiving said roll of dental floss;

a head portion including an internal bore dimensioned for sliding reception of said neck portion, an annular end face for engaging said shoulder, and first and second spaced arms, each arm having a floss receiving passage therethrough;

means associated with said shoulder and said face to limit rotation between said slidingly engaged handle portion and head portion between a first and a second position; and first and second radial openings in the wall of said neck portion and in the wall of said head portion, said openings being positioned for axial alignment in pairs when said handle portion and head portion are in said first position;

an accommodation groove in said head portion extending between said second radial opening and said second arm; and a further radial opening in said floss holder and in communication with said inner space, said floss being threaded from said inner space out of said holder through said first pair of openings, through the floss receiving passage of said first arm, across the outer tips of said arms, through the floss receiving passage in said second arm, along said accommodation groove and through said second pair of openings into said holder, and through said further opening out of said holder, in that order, whereby rotation of said head portion with respect to said handle portion towards said second position tensions said floss tightly and securely across said spaced arms.

12. A dental floss holder in accordance with claim 11 in which said first radial opening, said second radial opening, the floss receiving passage of said second arm and the floss receiving passage of said first arm are arranged along the direction of elongation of said head portion in that order, and in which a further accommodation groove extends in said head portion between said first radial opening and said first arm.

13. A dental floss holder in accordance with claim 12 in which said further accommodation groove overlies the accommodation groove between said second radial opening and said second arm, and which the depth of said last mentioned accommodation groove exceeds the depth of said further accommodation groove by at least the largest cross sectional dimension of the floss.

References Cited

UNITED STATES PATENTS

| | | | |
|---|---|---|---|
| 1,494,679 | 5/1924 | Fisher et al. | 132—92 |
| 1,588,307 | 6/1926 | Cammack | 132—92 |
| 1,723,842 | 8/1929 | Cammack | 132—92 |
| 2,163,500 | 6/1939 | Shepard | 132—92 |
| 2,837,098 | 6/1958 | Sorboro | 132—92 |

RICHARD A. GAUDET, *Primary Examiner.*

R. L. FRINKS, *Assistant Examiner.*

UNITED STATES PATENT OFFICE

CERTIFICATE OF CORRECTION

Patent No. 3,327,719                                June 27, 1967

William M. Ford

It is certified that error appears in the above identified patent and that said Letters Patent are hereby corrected as shown below:

In the heading to the printed specification, lines 4 to 6, "assignor to The Boeing Company, Seattle, Wash., a corporation of Delaware" should read -- assignor to James B. Moffatt, San Francisco, Calif. --.

Signed and sealed this 28th day of October 1969.

(SEAL)
Attest:

Edward M. Fletcher, Jr.
Attesting Officer

WILLIAM E. SCHUYLER, JR.
Commissioner of Patents